(12) United States Patent
Totzeck et al.

(10) Patent No.: US 12,558,727 B2
(45) Date of Patent: Feb. 24, 2026

(54) METHOD AND APPARATUS FOR ADDITIVE MANUFACTURE OF A WORKPIECE

(71) Applicant: Carl Zeiss Industrielle Messtechnik GmbH, Oberkochen (DE)

(72) Inventors: Michael Totzeck, Schwaebisch Gmuend (DE); Frank Widulle, Neu-Ulm (DE); Christian Platt, Ulm (DE); Beat Marco Mout, Aalen (DE); Diana Spengler, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 491 days.

(21) Appl. No.: 18/304,154

(22) Filed: Apr. 20, 2023

(65) Prior Publication Data

US 2023/0256513 A1 Aug. 17, 2023

Related U.S. Application Data

(63) Continuation of application No. PCT/EP2021/079021, filed on Oct. 20, 2021.

(30) Foreign Application Priority Data

Oct. 20, 2020 (DE) .......................... 102020127581.1

(51) Int. Cl.
*B22F 10/38* (2021.01)
*B22F 10/85* (2021.01)
(Continued)

(52) U.S. Cl.
CPC .............. *B22F 10/38* (2021.01); *B22F 10/85* (2021.01); *B22F 12/90* (2021.01); *B33Y 30/00* (2014.12); *B33Y 50/02* (2014.12)

(58) Field of Classification Search
CPC .......... B22F 10/38; B22F 10/85; B22F 12/90; B33Y 30/00; B33Y 50/02
See application file for complete search history.

(56) References Cited

U.S. PATENT DOCUMENTS 7,278,315 B1 10/2007 Klein
8,449,176 B2 5/2013 Shepard
(Continued)

FOREIGN PATENT DOCUMENTS

CN 105571505 A 5/2016
CN 110475635 A 11/2019
(Continued)

OTHER PUBLICATIONS

Everton, Sarah K. et al.: Review of in-situ process monitoring and in-situ metrology for metal additive manufacturing; Materials & Design, vol. 95, 2016, p. 431-445—ISSN 0261-3069 (P).
(Continued)

*Primary Examiner* — Ricardo D Morales
(74) *Attorney, Agent, or Firm* — Miller Johnson

(57) ABSTRACT

A method for additive manufacturing includes obtaining a dataset that defines the workpiece in multiple workpiece layers arranged one on top of the other. A layer stack of multiple workpiece layers is produced based on the dataset. The layer stack has a respective topmost workpiece layer at a defined instant of time. The layer stack is thermally excited at the defined instant of time and a sequence of images of the respective topmost workpiece layer is recorded. The layer stack is inspected using the sequence of images. The inspection involves evaluation of an individual temporal deformation profile of the respective topmost workpiece layer in (Continued)

response to the thermal excitation. The individual temporal deformation profile has multiple characteristic features including an individual deformation increase, an individual deformation maximum, and an individual deformation decrease. The inspection result is determined by evaluating at least one of the characteristic features.

18 Claims, 5 Drawing Sheets

(51) Int. Cl.
| | | |
|---|---|---|
| *B22F 12/90* | (2021.01) | |
| *B33Y 30/00* | (2015.01) | |
| *B33Y 50/02* | (2015.01) | |

(56) References Cited

U.S. PATENT DOCUMENTS

| | | | |
|---|---|---|---|
| 2008/0291465 | A1 | 11/2008 | Lorraine |
| 2015/0061170 | A1 | 3/2015 | Engel |
| 2015/0219444 | A1* | 8/2015 | Bamberg ............. G01B 11/162 |
| | | | 264/408 |
| 2017/0266727 | A1 | 9/2017 | Nishino |
| 2020/0158499 | A1 | 5/2020 | Stoppe |

FOREIGN PATENT DOCUMENTS

| | | | |
|---|---|---|---|
| DE | 102007031206 | B3 | 2/2009 |
| DE | 102014212246 | B3 | 8/2015 |
| DE | 102016115241 | A1 | 3/2017 |
| DE | 102016201289 | A1 | 8/2017 |
| DE | 102016110266 | A1 | 12/2017 |
| DE | 102017108874 | A1 | 10/2018 |
| DE | 102017124100 | A1 | 4/2019 |
| EP | 3444100 | A1 | 2/2019 |
| WO | 2020229391 | A1 | 11/2020 |

OTHER PUBLICATIONS

German Search Report for German App. No. DE 102020127581.1; dated Sep. 28, 2021; 6 pages.

* cited by examiner

METHOD AND APPARATUS FOR ADDITIVE MANUFACTURE OF A WORKPIECE

CROSS-REFERENCE TO RELATED APPLICATIONS

This application is a continuation of PCT International Application No. PCT/EP2021/079021 filed on Oct. 20, 2021, which claims priority to German App. No. 10 2020 127 581.1 filed on Oct. 20, 2020. The entire disclosures of the above applications are incorporated by reference.

FIELD

The present invention relates to additive manufacturing and more particularly to a method and an apparatus for the additive manufacturing of a workpiece.

BACKGROUND

Additive methods for manufacturing of workpieces are sometimes referred to as 3D printing. There are various additive manufacturing methods. In selective laser sintering (SLS) or selective laser melting (SLM), what is referred to as a powder bed made of a particulate material is used. Often the particulate material is a metallic material. However, there are also methods with particulate plastics materials, in particular polymers. Selected powder particles on the upper side of the powder bed are selectively melted or at least partially melted by means of a laser beam or electron beam and are in this way bonded to one another on cooling. A new layer of powder is then distributed over the workpiece structure and the unmelted residual powder, and a further workpiece layer is produced by means of the laser beam or electron beam. The workpiece is thus produced layer by layer in successive steps. As a rule, the individual workpiece layers are produced on a manufacturing platform from the bottom to the top, and the manufacturing platform is lowered by the layer height of the next layer after each workpiece layer.

The additive manufacturing of workpieces makes it possible to produce individual workpieces with a high degree of complexity and low material costs. At the same time, however, there are major challenges in terms of workpiece quality, since anomalies can occur in each individual material layer. Anomalies can result in defects, such as pores in the layer structure, micropores or porosity, local layer detachment/delamination, cracks inside and/or on the surface, dents, shape deviations, and/or material stresses. For this reason, there are numerous proposals for detecting defects in an additively manufactured workpiece, if possible even during the manufacture of the layer sequence. US 2015/0061170A1, for example, discloses an optical measurement sensor with a camera that can be set up to enable a 3D coordinate measurement on the respectively topmost material layer.

DE 10 2016 115 241 A1 discloses an additive manufacturing process that involves selectively heating a powder layer to form a solid workpiece layer. The workpiece layers produced are excited with ultrasonic energy waves using a wave generating laser. The propagated ultrasonic energy waves are detected and analyzed to determine physical properties of the workpiece layer. Further workpiece layers are produced in response to the information obtained. U.S. Pat. No. 7,278,315 discloses a further laser-ultrasonic method for detecting defects in an additively manufactured workpiece.

DE 10 2016 110 266 A1 discloses a method and an apparatus for the additive manufacturing of workpieces, wherein laser ultrasonic measurements, absolute measuring interferometry or laser pulse thermography are proposed for inspecting workpiece layers. In the latter case, thermal radiation emanating from the workpiece surface can be spectroscopically analyzed. DE 10 2016 110 266 A1 also mentions as an inspection method the measurement of the geometric shape and temperature of what is referred to as the melt pool.

DE 10 2014 212 246 B3 discloses thermal excitation of an additively manufactured workpiece during the manufacturing process in order to detect defects in the workpiece layers early by thermographically capturing and analyzing the thermal radiation from the topmost workpiece layer.

DE 10 2016 201 289 A1 discloses a further method for the additive manufacturing of a workpiece, wherein first measurement data are collected during the additive build-up using a thermographic material test or using an eddy current material test. After the additive build-up, second measurement data are collected by means of computed tomography and compared with the first measurement data. Results of the material test are to be classified using an algorithm, which is not described in more detail, from the field of supervised machine learning.

DE 10 2017 124 100 A1 discloses a method and an apparatus for the additive manufacturing of workpieces, wherein testing by means of laser ultrasound is carried out during the manufacture. For the analysis, the result of the test is compared with the result of a simulation of the test.

The publication "Review of in-situ process monitoring and in-situ metrology for metal additive manufacturing" by Everton et al., Materials and Design 95 (2016), 431-445, gives an overview of different methods for the inspection of additively manufactured workpieces using camera images and pyrometry.

U.S. Pat. No. 8,449,176 B2 describes a method for automatically processing thermographic data that are recorded after thermal excitation of a measurement object. The variance of the data is compared with the variance of corresponding data relating to a reference object.

DE 10 2017 108 874 A1 and US 2020/158499 A1, which has the same priority, disclose an optical system for generally enabling material testing with the aid of illumination from a plurality of different directions. In some variants, the system can be used to determine a height map of a material layer to be tested.

SUMMARY

Additively manufactured surfaces and thus also the surface of each individual workpiece layer are typically very rough (in the range of a few µm rms) and produce strong reflections, at least when using metallic material particles. In addition, topographical reliefs are often produced, e.g. writing traces due to the laser process (chevron pattern) or patterns (e.g. chequerboard pattern) due to the scanning strategy. In addition, defects can arise on the surface in the process (e.g. balling or particle deposits). Overall, these variations, which can be in the range of several 100 µm, result in the inspection of the workpiece layers and in particular the detection of defects under the surface being very difficult. Due to the rough surface and the further surface variations, local temperature changes and deformations that are not caused by anomalies and defects in the workpiece can occur during thermal stimulation. The temperature changes and deformations on the rough surface are superimposed on signals from the workpiece layers underneath. An inspection method, in which signals caused by the surface topography can be distinguished more reliably from anomaly signals from the workpiece layers, is therefore desirable.

In view of this background, it is an object to provide an alternative method and a corresponding apparatus for the additive manufacturing of workpieces with a high quality.

It is another object to provide a method and an apparatus that allow to monitor the quality of the material layers in an additive manufacturing process in an efficient manner.

It is yet another object to provide a method and an apparatus that allow to correct imminent layer defects early in the additive manufacturing process.

It is yet another object to provide a method and an apparatus that allow for anomalies in the workpiece layers to be distinguished as reliably as possible from effects that can be caused by rough but defect-free surfaces.

According to a first aspect, there is provided a method for additively manufacturing a workpiece, comprising the steps of: obtaining a dataset that defines the workpiece in a plurality of workpiece layers arranged one on top of the other; producing the plurality of workpiece layers arranged one on top of the other using a layer forming tool which is controlled in dependence on the dataset, wherein the plurality of workpiece layers form a layer stack which, at a defined instant of time, has a respective topmost workpiece layer and a number of respective workpiece layers underneath; thermally exciting the layer stack at the defined instant of time; recording a sequence of images of the respective topmost workpiece layer; and inspecting the layer stack using the sequence of images in order to obtain an inspection result that is representative of the workpiece; wherein an individual temporal deformation profile of the respective topmost workpiece layer is determined in response to the thermal excitation using the sequence of images; wherein the individual temporal deformation profile has a plurality of characteristic features including an individual deformation increase, an individual deformation maximum, and an individual deformation decrease; and wherein the inspection result is determined by evaluating at least one of the characteristic features from the plurality of characteristic features. The inspection result is preferably determined using at least two of the characteristic features. It is also preferred if the at least one of the characteristic features mentioned includes the individual deformation maximum.

According to a further aspect, there is provided an apparatus for additively manufacturing a workpiece, comprising a memory for obtaining a dataset that defines the workpiece in a plurality of workpiece layers arranged one on top of the other; a manufacturing platform; a layer forming tool; a heating tool; a camera directed at the manufacturing platform; and an evaluation and control unit configured to produce a plurality of workpiece layers arranged one on top of the other on the manufacturing platform using the layer forming tool and the dataset, the plurality of workpiece layers forming a layer stack which, at a defined instant of time, has a topmost workpiece layer and a number of workpiece layers underneath, configured to thermally excite the layer stack at the defined instant of time using the heating tool, configured to record a sequence of images of the topmost workpiece layer using the camera, configured to determine an individual temporal deformation profile of the topmost workpiece layer in response to the thermal excitation using the sequence of images, and configured to inspect the layer stack using the individual temporal deformation profile, wherein the individual temporal deformation profile has a plurality of characteristic features including an individual deformation increase, an individual deformation maximum, and an individual deformation decrease, and wherein the evaluation and control unit determines the inspection result using at least one of the characteristic features from the plurality of characteristic features.

The novel method and apparatus utilize thermal excitation of the layer stack in order to detect defects as early as possible in the manufacturing process. In contrast to prior art methods and apparatus, a deformation profile over time of the topmost workpiece layer is now determined and analyzed/evaluated using the images. The novel method and the novel apparatus primarily consider mechanical (dimensional and/or geometric) changes on the workpiece surface in response to the thermal excitation. In some example embodiments, a thermal analysis of the layer stack in response to the thermal excitation, such as a temperature distribution, can be carried out additionally and complementarily to the analysis of the deformation profile, and the inspection results of the thermal analysis can advantageously be combined with the inspection results from the deformation profile. Irrespective of this, the defect detection in the novel method and the novel apparatus is based on an analysis of the mechanical deformations of the layer stack in response to a thermal excitation that manifests in the topmost workpiece layer.

The novel method and the novel apparatus also consider the temporal behavior of the layer stack in response to the thermal excitation. What is analyzed is therefore not only whether or to what extent a deformation of the layer stack becomes visible on the topmost workpiece layer. Rather, the temporal profile of the deformations is analyzed over a defined time interval at the beginning and/or after the thermal excitation. The sequence of images are therefore advantageously recorded in a time series in a time-staggered manner. In other words, the sequence of images advantageously includes an image stack in which the images are contained in a temporal sequence. As described below with reference to preferred example embodiments, anomalies in the layer stack, including anomalies under the surface of the topmost workpiece layer, can thus be reliably detected, even if the layer surfaces exhibit roughness and/or have writing structures and/or cause light reflections.

As explained in more detail below, the temporal deformation profile has a plurality of features that can be characteristic of an anomaly in the layer stack. These features are in particular an individual deformation increase, which can manifest as a rising edge in the deformation profile, an individual deformation maximum in the deformation profile, and an individual decrease in deformation, which can be seen as a falling edge in the deformation profile. In some example embodiments, turning points can be searched for in an individual deformation profile and analyzed. The novel method and the novel apparatus advantageously use at least two of these three mentioned features in the analysis of the temporal deformation profile and the detection of anomalies because it has been shown that a more reliable differentiation from interference signals from a rough but defect-free surface is possible in this way. The inspection result is particularly advantageously determined using the individual deformation maximum in the deformation profile, referred to as overshoot in the following, because this feature is particularly characteristic of a cavity under the surface of the topmost workpiece layer and such a cavity can be a serious defect. Furthermore, it is preferred in some example embodiments if all three of the features mentioned are used in combination with one another to determine the inspection result.

As already indicated, the novel method and the novel apparatus enable a reliable detection of anomalies in the layer sequence of an additively manufactured workpiece already in the manufacturing process. The above objects are therefore completely achieved.

In a preferred refinement, each image from the sequence of images has a plurality of image segments, and for each image segment from the plurality of image segments, a respectively individual temporal deformation profile in response to the thermal excitation is determined, wherein the inspection result is determined using the respectively individual temporal deformation profiles.

Each image segment can advantageously be a separate image pixel, so that a plurality of individual temporal deformation profiles are determined pixel by pixel using the images. However, it is also possible to determine and analyze individual temporal deformation profiles using pixel clusters or image segments that include numerous image pixels. Determining a plurality of individual temporal deformation profiles using the plurality of temporally staggered images makes it possible to determine the lateral extent and/or lateral distribution of detected anomalies. Therefore, it is possible with this refinement to obtain a quantitative estimate of the size of any defects. This makes it easier to make a decision about the quality characteristics of the workpiece and its suitability for the intended purpose. The term "images" can on the one hand refer to intensity images, as are recorded with a camera, in particular images that have a plurality of image pixels, each of which represents an intensity value in terms of brightness, for example grayscale value images. On the other hand, the term "images" here can advantageously refer to complex amplitude and phase images that can be determined from intensity images with the aid of image processing.

In a further refinement, the thermal excitation of the layer stack includes thermal excitation of the topmost workpiece layer in a first layer region that is locally delimited, and the sequence of images show the first layer region and a further layer region of the topmost workpiece layer, wherein the first layer region and the further layer region are disjoint.

In this refinement, the images show the thermally excited region of the topmost workpiece layer and a further region of the topmost workpiece layer that is not, or at least is not directly, excited and is therefore different from the first region. For example, the thermal excitation can take place with a laser beam with a diameter of several mm. In general, the thermal excitation can take place on the topmost workpiece layer in a local region with a diameter of up to 20 mm, preferably in a region of up to 10 mm. Since the images show a further layer region that is not, or not directly, excited, this refinement makes it possible to determine one or more individual deformation profiles that do not, or at least do not directly, show a reaction to the thermal excitation. Such further deformation profiles can advantageously be determined in the novel method and the novel apparatus and used as reference deformation profiles. For example, reference deformation profiles make it possible to detect any time-variant deformations in the layer stack that do not, or do not directly, stem from the thermal excitation, but are the result of vibration, shock, or another unwanted influence. The novel method and the novel apparatus advantageously use such a reference deformation profile in order to normalize the one or more temporal deformation profiles and thus to eliminate vibration influences. For example, one or more reference deformation profiles can be subtracted from the one or more temporal deformation profiles in order to maximize the influence of the thermal excitation. Moreover, this refinement allows a simpler localization of a defect in the images. The refinement therefore contributes to an even more reliable defect detection.

In a further refinement, the sequence of images include at least one first image of the topmost workpiece layer recorded before the thermal excitation, wherein the inspection result is determined using the at least one first image.

In this refinement, the image stack of the images recorded in a time series includes at least one image that shows the topmost workpiece layer without the thermal excitation. Such an image can be recorded at the beginning of each new time series and thus before each new excitation. However, it can also be provided as a reference image for a plurality of image stacks in a memory. The refinement provides a global reference image without thermal excitation that facilitates localization of detected anomalies. It can also be used advantageously for vibration compensation. This refinement therefore also advantageously contributes to an even more reliable defect detection.

In a further refinement, the sequence of images is normalized using at least one reference image before the individual temporal deformation profile is determined.

This refinement also advantageously contributes to viewing the reaction of the layer stack to the thermal excitation with as few disturbances as possible, in that image information that cannot be attributed to the thermal excitation can be minimized. For example, by subtracting the at least one reference image from the temporally staggered images of the image stack, a respectively normalized time image can be generated in which the reaction of the layer stack to the thermal excitation is more strongly pronounced. The refinement thus advantageously contributes to achieving an even higher level of detection reliability.

In a further refinement, the sequence of images is recorded with a frame rate of ≥1 kHz.

Such a frame rate has proven to be advantageous for analyzing the abovementioned characteristic features in the at least one deformation profile with a high level of reliability. Such a frame rate advantageously enables a transient analysis with a temporal resolution that is so high that even smaller defects, including porous locations in the layer stack, can be reliably detected.

In a further refinement, the inspection result is determined based on the sequence of images using a principal component analysis.

A principal component analysis (PCA) is a mathematical method of statistics known per se. It is advantageously suitable for structuring and simplifying extensive datasets by approximating a plurality of statistical variables using a smaller number of linear combinations that include as much information as possible, the so-called principal components. The principal component analysis enables an analysis of many deformation profiles in a very advantageous and efficient way and is therefore particularly well suited when individual temporal deformation profiles are to be analyzed over many image segments and even at the pixel level. In some example embodiments, the characteristic features of each deformation profile or, alternatively, a polynomial or a rational function with up to 6 degrees of freedom can advantageously be used to model the temporal change in each deformation profile in logarithmic form. The coefficient images generated in this way can be converted into a smaller number of more compressed PCA coefficient images by means of principal component analysis. Cluster algorithms can then advantageously be applied to these compressed PCA coefficient images for segmentation purposes. In combination with a threshold value decision, an anomaly probability can then be determined in the respective segmented image regions in an efficient manner. The principal component analysis therefore enables a very efficient determination of the inspection result.

In a further refinement, the layer stack is repeatedly thermally excited, and the inspection result is determined in dependence on of the repeated excitations. In some preferred variants of this refinement, at least one excitation parameter, in particular an excitation intensity and/or an excitation duration, is varied, and the inspection result is determined in dependence on of the at least one excitation parameter.

In this refinement, a plurality of measurement series are carried out on an topmost workpiece layer by repeating steps c) and d), which were mentioned in the introductory part. The intensity of the excitation, for example the energy of the laser pulse or the duration of the excitation, can vary from measurement series to measurement series. Furthermore, the location or an excitation pattern on the topmost workpiece layer can be varied from measurement series to measurement series. In this way, a plurality of individual deformation profiles are obtained, which can be correlated with one another directly or, for example, after a principal component analysis in order to detect anomalies under the surface of the topmost workpiece layer even more reliably. Yet even without varying the excitation parameters, a repeated measurement may be advantageous for increasing the reliability of the measurement, for example by averaging.

In a further refinement, the inspection result is determined using a sequence of images of a plurality of respective topmost workpiece layers.

In this refinement, a plurality of measurement series are carried out on a plurality of respective topmost workpiece layers by repeatedly carrying out the steps explained above on the respective topmost workpiece layers, wherein the respective inspection result is determined on the basis of the plurality of measurement series. Weighted temporal averaging of the deformation profiles of temporally successive respectively topmost workpiece layers can be carried out particularly advantageously. Since the roughness and topography of different successive layers differ, stochastic effects of the individual layers can be reduced with such averaging. On the other hand, an anomaly under the respectively topmost workpiece layer will affect each measurement series and can therefore be detected even more reliably.

In a further refinement, the individual temporal deformation profile is determined using at least one of the following measurement methods: speckle interferometry, digital holography, shearography; laser Doppler vibrometry, Fabry-Perot interferometry, Sagnac interferometry, interferometry with nonlinear optics.

A surface measurement with interferometric accuracy can be performed in a speckle interferometer using coherent light, e.g. with an electronic speckle pattern interferometer (ESPI). ESPI is particularly advantageous for use in technical surfaces with roughness in the range of several μm rms. In addition, ESPI enables the measurement of deformations orthogonal to the surface (z-direction, "out-of-plane") and also in the surface plane (x/y-direction, "in-plane"). For an area-based measurement in the kHz range that is fast in a process-adapted manner, it is advantageous to use an ESPI system with a spatial (rather than temporal) phase shift. If for application reasons the measured variables exceed the unambiguous range of the interferometer (due to a combination of heating parameters, frame rate, material), phase unwrapping algorithms can be applied to the measured values or two or more wavelengths can be used in the interferometer to increase the unambiguous range. The use of two different wavelengths or angles (observation or illumination direction) in the speckle interferometer allows the surface shape/topography to be measured.

In shearography, a shearing element (e.g. a wedge plate or a tilting mirror) is used in the optical beam path, as a result of which the surface to be measured is imaged on the camera sensor both directly and laterally offset at the same time. The measured variable here is the gradient of the deformation in the direction of the lateral image offset. As a result, the sensitivity is given fundamentally along a preferred lateral direction, which is why it is advantageous for capturing the overall deformation to carry out a further measurement in a further lateral direction (preferably orthogonal to the first).

Speckle interferometry and shearography have the advantage that the measurement results have a high lateral and axial resolution. They are therefore advantageous when the aim is to inspect large-area workpieces. In contrast to this, it is advantageous to combine laser Doppler vibrometry, Fabry-Perot interferometry, Sagnac interferometry or interferometry with non-linear optics with a scan of the workpiece surface in a lateral direction, i.e., to scan the workpiece surface. The methods mentioned have a high axial resolution and therefore enable a reliable detection of anomalies in the depth of the layer stack.

A vibrometer is commonly used for vibration analyses using the optical Doppler effect to measure surface velocities and/or displacements. Scanning systems (3D scanning vibrometers) or multipoint vibrometers are suitable for a spatially resolved measurement. A multipoint vibrometer is advantageous for an area-based measurement in the kHz range that is fast in a process-adapted manner in order to obtain a time-synchronous recording of all the measurement points on the surface.

All of the aforementioned methods enable a very detailed determination of thermally excited deformation profiles using the recorded images.

In a further refinement, the inspection result is furthermore determined using a thermal transient profile and/or using ultrasonic excitation and/or using a simulated deformation profile and/or using melt pool characterization and/or using angle-selective illumination of the topmost workpiece layer.

In this refinement, the inspection based on thermally excited deformation transients is combined with other inspection methods which, taken individually, have already been proposed in the prior art mentioned in the introductory part. The refinement enables an even more reliable detection of defects under the surface of the topmost workpiece layer due to the information density which has been increased once again. The inspection methods that are known per se become even more effective in combination with the novel method and the novel apparatus. The combination of the inspection based on deformation transients and an inspection of the powder bed with embedded workpiece layers using angle-selective illumination, as described in DE 10 2017 108 874 A1 mentioned in the introductory part and US 2020/158499 A1 with the same priority, is particularly advantageous.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Example embodiments of the invention are illustrated in the drawing and will be explained in greater detail in the following description.

DETAILED DESCRIPTION

Figure 1:
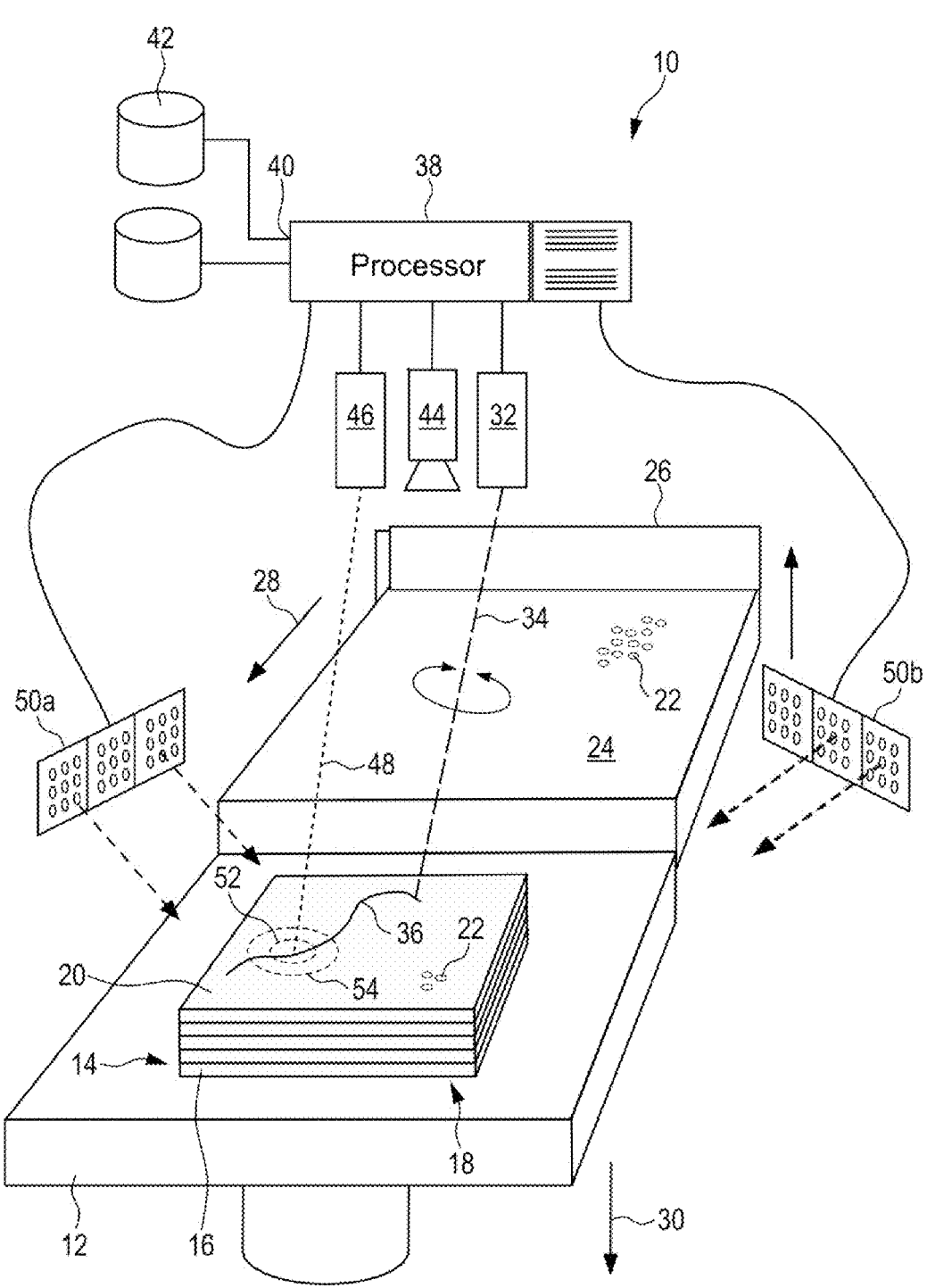
FIG. 1 is a schematic illustration of an example embodiment.

In FIG. 1, an example embodiment of the novel apparatus is denoted in its entirety by the reference numeral 10. The apparatus 10 has a manufacturing platform 12, on which a workpiece 14 is additively manufactured in accordance with an example embodiment of the novel method. The workpiece 14 is built up layer by layer from the bottom to the top in temporally successive steps, that is to say with workpiece layers 16 arranged one above the other. The workpiece layers 16 form a layer stack 18 with a respective topmost workpiece layer 20.

In the example embodiment illustrated here, the workpiece layers 16, 20 each are manufactured from a particulate material 22, in particular a metallic material and/or a plastics material in what is known as a powder bed. The particulate material 22 is taken from a reservoir 24 and distributed on an existing layer stack 18 with the aid of a doctor blade 26, which is movable in the direction of the arrow 28. For this purpose, the manufacturing platform 12 is typically lowered in the direction of the arrow 30 by the height of the next workpiece layer and/or the reservoir 24 is raised relative to the manufacturing platform 12.

Reference numeral 32 denotes a tool with which the particulate material 22 can be selectively solidified on the layer stack 18. In some example embodiments, the tool 32 includes a laser beam 34 and moves it along a trajectory 36 relative to the manufacturing platform 12 to produce a workpiece layer 18 from the particulate material 22. The material particles can be selectively melted and/or partially melted with the laser beam 34 so that they bond to one another and solidify on cooling. Such a manufacturing principle is known as selective laser melting (SLM) or selective laser sintering (SLS).

In other example embodiments, the layer forming tool 32 may generate an electron beam to produce a workpiece layer on the manufacturing platform 12. Furthermore, the apparatus 10 can include more than one layer forming tool 32, that is to say it can use for instance two or more laser and/or electron beams for producing workpiece layers. However, the novel method and the novel apparatus are not limited to such a manufacturing principle. Alternatively or additionally, the workpiece layers can be produced using other additive methods involving other layer forming tools, for example using what is known as stereolithography or by selectively supplying and/or depositing material.

The layer forming tool 32, referred to as the writing laser for the sake of simplicity in the following, is connected to an evaluation and control unit, hereinafter referred to as a controller 38 for short, which controls the movement of the laser beam 34. The controller 38 has an interface 40 via which a dataset 42 can be read in which defines the workpiece 14 to be manufactured in a plurality of layers arranged one on top of the other. The controller 38 controls the movement of the laser beam 34 relative to the layer stack 18 on the basis of the dataset 42, wherein the laser beam 30 describes a trajectory 36 in each workpiece layer 16, 18 to be manufactured, which trajectory results from the dataset 42 in each case. In some example embodiments, the controller 38 is implemented with the aid of one or more commercially available personal computers running an operating system, such as Microsoft Windows, MacOS or Linux, and one or more control programs with which example embodiments of the novel method are implemented. In some example embodiments, the controller 38 can be implemented as a soft PLC on a commercially available PC. Alternatively or additionally, the controller 38 can be implemented with the aid of dedicated control hardware with one or more ASICs, FPGAs, microcontrollers, microprocessors, or comparable logic circuits.

The apparatus 10 further has a measurement arrangement that is set up to inspect the workpiece layers 16, 20. In some advantageous example embodiments, the measurement arrangement is also set up to inspect the respective topmost material layer made of the particulate material 22 on the layer stack 18 before the particulate material 22 is selectively solidified to form a new workpiece layer.

The measurement arrangement here includes a camera 44 and a heating tool 46, each of which is connected to controller 38 (or to a separate controller for the measurement arrangement, not shown here). The camera 44 is set up to record a sequence of images of the respective topmost workpiece layer 18 of the layer stack 18. The heating tool 46 is set up to thermally excite the layer stack 18 at a defined instant of time. In some example embodiments, the heating tool 46 includes a further laser beam 48, which illuminates the respectively topmost material layer 18 and heats up the layer stack 18 locally. Alternatively or additionally, the heating tool 46 can include an electron beam and/or thermally excite the layer stack 18 inductively with an energy pulse.

The thermal excitation increases the temperature on the surface of the layer stack 18. Due to the temperature gradient, the heat spreads from the surface into the volume of the layer stack. The material expands in the process. This expansion leads to local deformations in the layer stack and on its surface, whose spatial and temporal profile is captured with the measurement arrangement. The measurement arrangement can advantageously capture the deformations with the aid of the camera 44 and interferometry. Accordingly, the camera 44 can be an integral part of an interferometric measurement system, in particular a speckle interferometer. Alternatively or additionally, the measurement arrangement can implement shearography, laser Doppler vibrometry, Fabry-Perot interferometry, Sagnac interferometry, and/or interferometry with non-linear optics.

The mechanical deformations in response to the thermal excitation depend on the material properties and also on the individual layer structure. Surface roughness and the trajectories 36 of the writing beam 34 can influence the individual layer structure. The measurement arrangement with the camera 44 and the heating tool 46 is set up to capture the local deformations in the layer stack in response to the thermal excitation with both temporal and spatial resolution. The evaluation and control unit 38 is further advantageously set up to analyze the transients in the captured deformations. If locally varying behavior of the dimensionally measurable variables is ascertained on the surface of the layer stack, conclusions can be drawn relating to the material properties, and in particular defects (anomalies) in the layer stack can be determined. Examples of such defects are blow-holes, porosity, unmelted particles, delamination, etc. With varying porosity, for example, the heat conduction changes. In the case of individual defects, such as blow-holes with an extent of several 100 μm in all three dimensions, a heat build-up together with the mechanical properties leads, for example, to a characteristic temporal deformation profile, as is explained in more detail further below with reference to FIGS. 2 and 3.

In some example embodiments, the measurement arrangement may include an illumination arrangement with a plurality of illumination modules 50a, 50b arranged at different positions relative to the manufacturing platform 12 in order to illuminate the surface of the layer stack from a plurality of different directions. In combination with the camera 44, the illumination arrangement can advantageously be used to additionally inspect the surface of the layer stack using a method as described in US 2020/158499 A1 incorporated herein by reference. In a particularly advantageous manner, the surface of the powder bed can be inspected with the aid of the illumination arrangement before the particles are selectively solidified, in order to detect the occurrence of anomalies early and to avoid them as far as possible.

FIG. 1 indicates how the laser beam 48 illuminates a locally delimited layer region 52 on the topmost workpiece layer 20. The laser beam 48 can, for example, have a diameter in the range from 1 mm to 10 mm and a Gaussian or preferably flat-top-shaped intensity profile. A further layer region 54 which is not directly thermally excited is indicated here around the thermally excited layer region 52. The further layer region 54 is shown here as an example largely concentrically to the layer region 52. However, it can also be arranged at a spatial distance from and/or next to the layer region 52. As already indicated further above, one or more individual temporal deformation profiles can be determined in the further layer region 54 and can serve as a reference in the analysis of individual temporal deformation profiles from the layer region 52.

Figure 2:
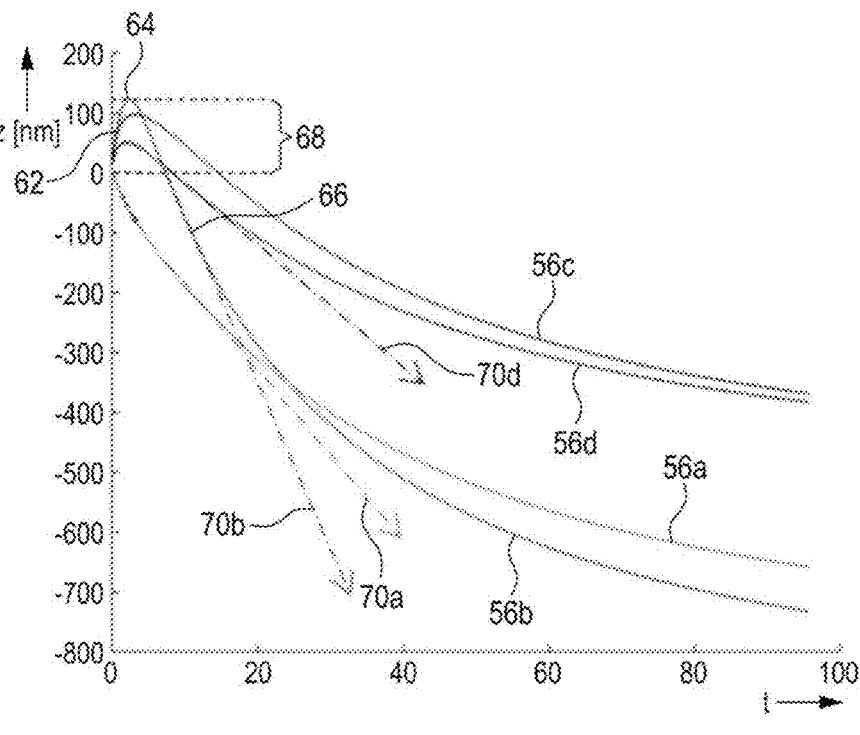
FIG. 2 is a few example deformation profiles to explain example embodiments.
Figure 3:
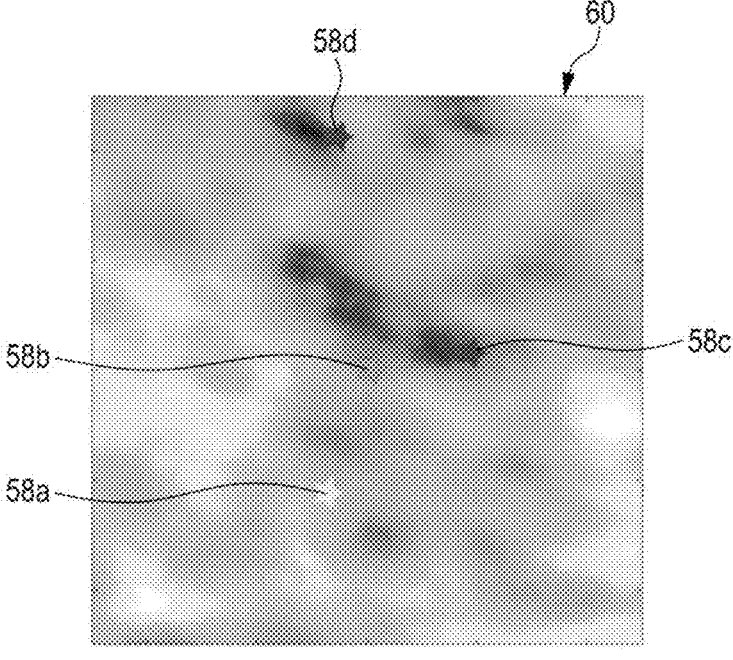
FIG. 3 is an example image of a topmost workpiece layer in order to illustrate example embodiments.

FIG. 2 shows, by way of example, a plurality of individual temporal deformation profiles 56a, 56b, 56c, 56d, which were determined here at selected pixels 58a, 58b, 58c, 58d of an image stack recorded with the camera 44. The image stack includes a sequence of images 60, one of which is shown in FIG. 3 by way of example. The images 60 of the image stack each show the deformations on the surface of the topmost workpiece layer after it has been thermally excited with the heating tool. In preferred example embodiments, the images 60 are recorded at a frame rate of 1 kHz or more. Accordingly, the deformation profiles 56a, 56b, 56c, 56d each have a temporal resolution of 1 ms or less here. The time t is given in ms on the abscissa in FIG. 2, wherein the thermal excitation took place here with a heating pulse which lasted a few milliseconds, approximately 5 ms, and ended here at t=0. In other words, FIG. 3 shows different individual deformation profiles 56a, 56b, 56c, 56d from the moment the thermal excitation has been switched off at time t=0. A dimension z in nm in the axial direction, i.e., perpendicular to the surface of the topmost workpiece layer 20, is given on the ordinate. The dimension z shows the deformations on the surface of the layer stack 18 perpendicular to the surface of the topmost workpiece layer 20.

In this case, the deformation profile 56a is an example of a workpiece region (or a pixel 58a imaging this workpiece region) which includes neither a hidden anomaly nor a disturbing surface roughness. The deformation profile 56a here shows a continuously decreasing curve corresponding to the deformation that is continuously decreasing after the heating pulse has been switched off. In contrast, the deformation profile 56b initially has an individual deformation increase 62 up to an individual deformation maximum 64. Only after the individual deformation maximum 64 does the deformation profile 56b drop with an individual deformation decrease 66. The so-called overshoot 68, which is the difference between the individual deformation maximum 64 and the maximum of the deformation profile 56a here, is a characteristic feature of a cavity hidden under the workpiece surface, hence an anomaly, because the heat initially builds up above the cavity. The deformation profiles 56c and 56d are examples of workpiece regions without hidden anomalies, but with roughness signals from the workpiece surface. A certain overshoot can also be seen here, but it is less pronounced than in the case of the deformation profile 56b. In addition, the deformation decrease is in each case flatter than in the case of the deformation profile 56b, as can be seen from the tangents 70a, 70b, 70d drawn in dashed lines.

Figure 4:
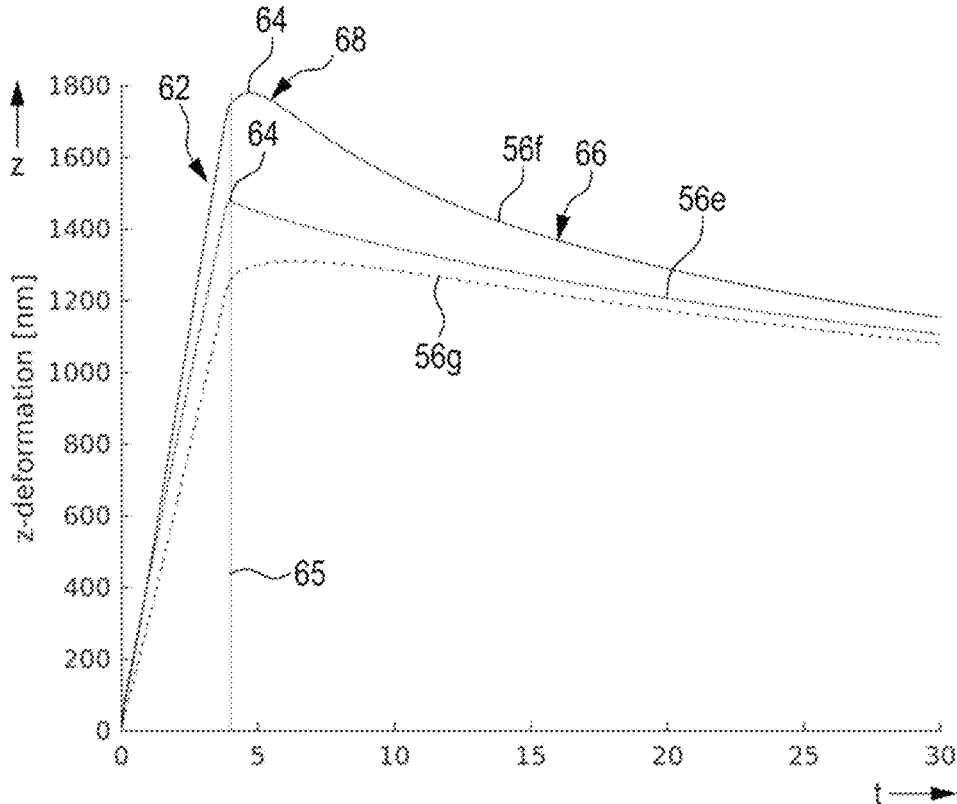
FIG. 4 is further example deformation profiles to illustrate example embodiments.

FIG. 4 shows as examples three individual temporal deformation profiles 56e, 56f, 56g, which represent the time period of the thermal excitation itself (from time t=0) and also a time period after the thermal excitation has been switched off at approximately t=4 ms. The deformation profile 56e is here again an example of a workpiece region (or a pixel imaging this workpiece region) which includes neither a hidden anomaly nor a disturbing surface roughness. It can thus be viewed as a reference profile. The deformation profile 56e has a medium-strong increase 62 in the local deformation up to a maximum 64, which is reached at the time the thermal excitation is switched off (here at reference sign 65), and a medium-strong decrease in the local deformation that starts at that time. In contrast, compared with the deformation profile 56e, the deformation profile 56f has a steeper increase in the local deformation during the thermal excitation and additionally the previously mentioned overshoot 68. The individual deformation maximum 64 of the deformation profile 56f occurs only after the thermal excitation (indicated at reference sign 65) has been switched off. The deformation profile 56f is typical of an anomaly hidden under the workpiece surface. The decrease 66 of the deformation is likewise steeper compared with the deformation profile 56e. Here, too, the deformation profile 56g is an example of a workpiece region without hidden anomalies, but with roughness signals from the workpiece surface. It can be seen that both the deformation increase and the deformation decrease are less steep than in the case of the deformation profiles 56e and 56f In contrast to the deformation profile 56e, the deformation profile 56g has an overshoot, but this is smaller than in the case of the deformation profile 56f. The absolute magnitudes of the various signals depend, among other things, on the respective local heating power and (if present) on the defect size and depth and also on the surface structure. A deep-lying defect can therefore in principle cause a smaller signal than roughness on the surface, which is why the deformation profiles are analyzed relative to a reference profile in some example embodiments.

Accordingly, a plurality of characteristic features of a temporal deformation profile indicate an anomaly in contrast to roughness effects of the surface. The characteristic features 62, 64, 66 enable detection of material anomalies and even their depth determination:

a) For one part, the heat needs a short period of time to penetrate to the deeper-lying anomaly, to generate a heat build-up, and to cause an associated measurable surface deformation. Within this initial time window "onset time" during the thermal excitation, effects that are primarily seen are effects that manifest in the steepness of the deformation increase. A characteristic feature of an anomaly is the greater slope of the deformation profile 56*f* compared with the slope of the deformation profile 56*e* and of the deformation profile 56*g*.

b) Another distinguishing feature between roughness signals and an anomaly to be detected below the surface becomes visible at the moment the thermal excitation is switched off and afterward. The surrounding area outside the anomaly cools much faster than the region above it, which leads to elastic deflection, i.e., to a kind of additional deformation directly above the anomaly. This additional deformation ("overshoot") after switching off the thermal excitation source can advantageously be used as a necessary criterion for an underlying anomaly.

c) Due to the built-up heat above the anomaly and the associated stronger overall deformation, a stronger elastic relaxation also takes place above the anomaly after switching off the thermal excitation and after the effect described in b) ("fall-off").

Figure 5:
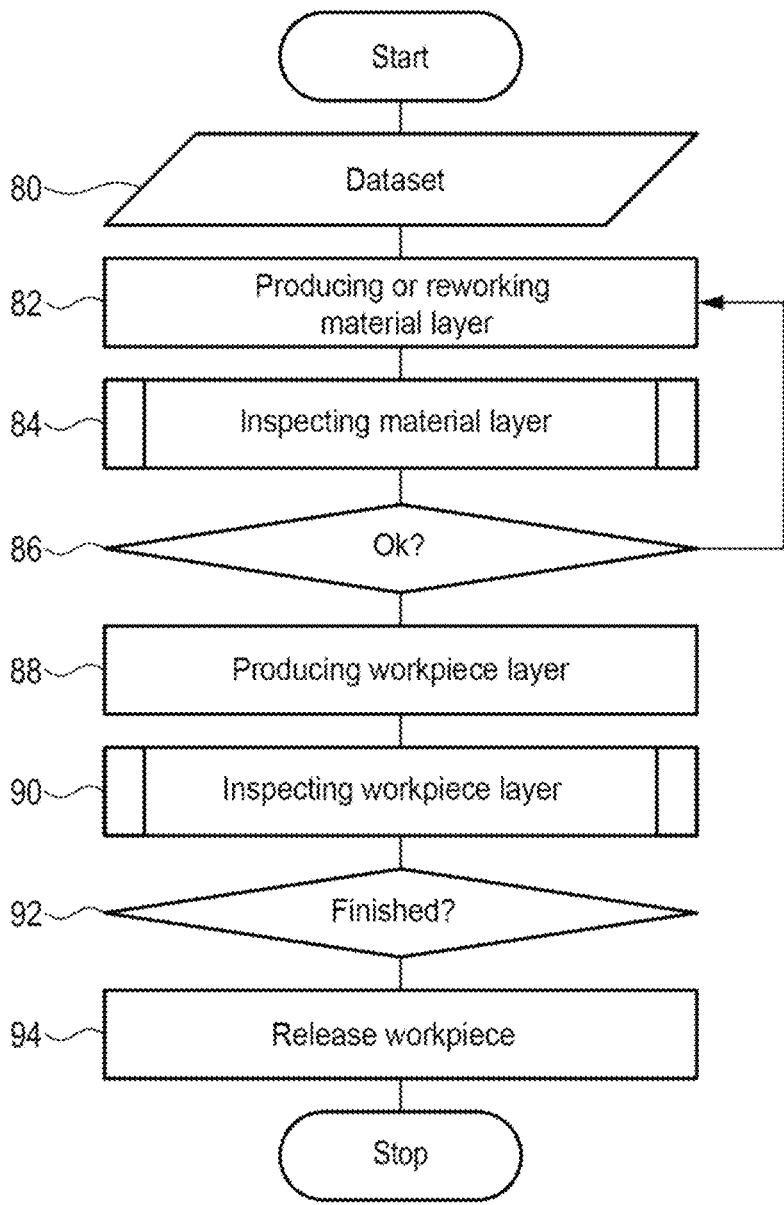
FIG. 5 is a flowchart to explain an example embodiment.

Example embodiments of the novel method, which can be implemented with the aid of one or more control programs on the apparatus according to FIG. 1, will be explained below with additional reference to FIGS. 5 and 6. According to step 80, a dataset 42 is read into the controller 38, which defines the workpiece 14 in a plurality of workpiece layers 16, 20 arranged one on top of the other. As an alternative or in addition thereto, the controller 38 could first receive a dataset via the interface 40, which dataset defines the workpiece to be manufactured "as a whole," such as a CAD dataset, and based on this, determine the plurality of workpiece layers 16, 20 arranged one on top of the other. In this case, too, the controller 38 ultimately receives a dataset which defines the workpiece 14 in a plurality of workpiece layers 16, 20 arranged one on top of the other. According to step 82, a material layer made of particulate material 22 is produced on the layer stack 18 with the doctor blade 26.

According to step 84, the surface of the material layer is advantageously (but not absolutely necessarily) inspected with the aid of the camera 44 and the illumination modules 50*a*, 50*b* in order to detect any anomalies, such as in particular grooves, holes, depressions, waves, accumulations of material, density variations, and/or particle inhomogeneities (e.g., lumps) in the material layer. If the surface of the material layer meets all the desired criteria, the method according to step 86 branches off to step 88, according to which an topmost workpiece layer 20 is produced with the aid of the writing laser 32. The writing laser 32 selectively melts material particles along the defined trajectory 36 and in this way bonds the melted or partially melted particles to one another.

If the surface of the new material layer does not meet or does not sufficiently meet the desired criteria, the method can advantageously return to step 82 to rework or completely recreate the surface of the material layer. According to step 90, an topmost workpiece layer 20 that has been produced is inspected with the aid of the camera 44 and the heating tool 46, wherein the inspection based on the novel method can also detect anomalies in the depth of the layer stack 18. Anomalies can also form later, for example due to stress cracks or later delamination between individual workpiece layers 16. In accordance with step 92, steps 82-90 are repeated until the workpiece 14 is completed in accordance with the dataset 42. If necessary, a subsequent workpiece layer can then be modified in order to correct a deviation in shape or size. According to step 94, the manufactured workpiece can be released for an intended use on the basis of the inspection results from the repeated steps 82 and/or 90.

Figure 6:
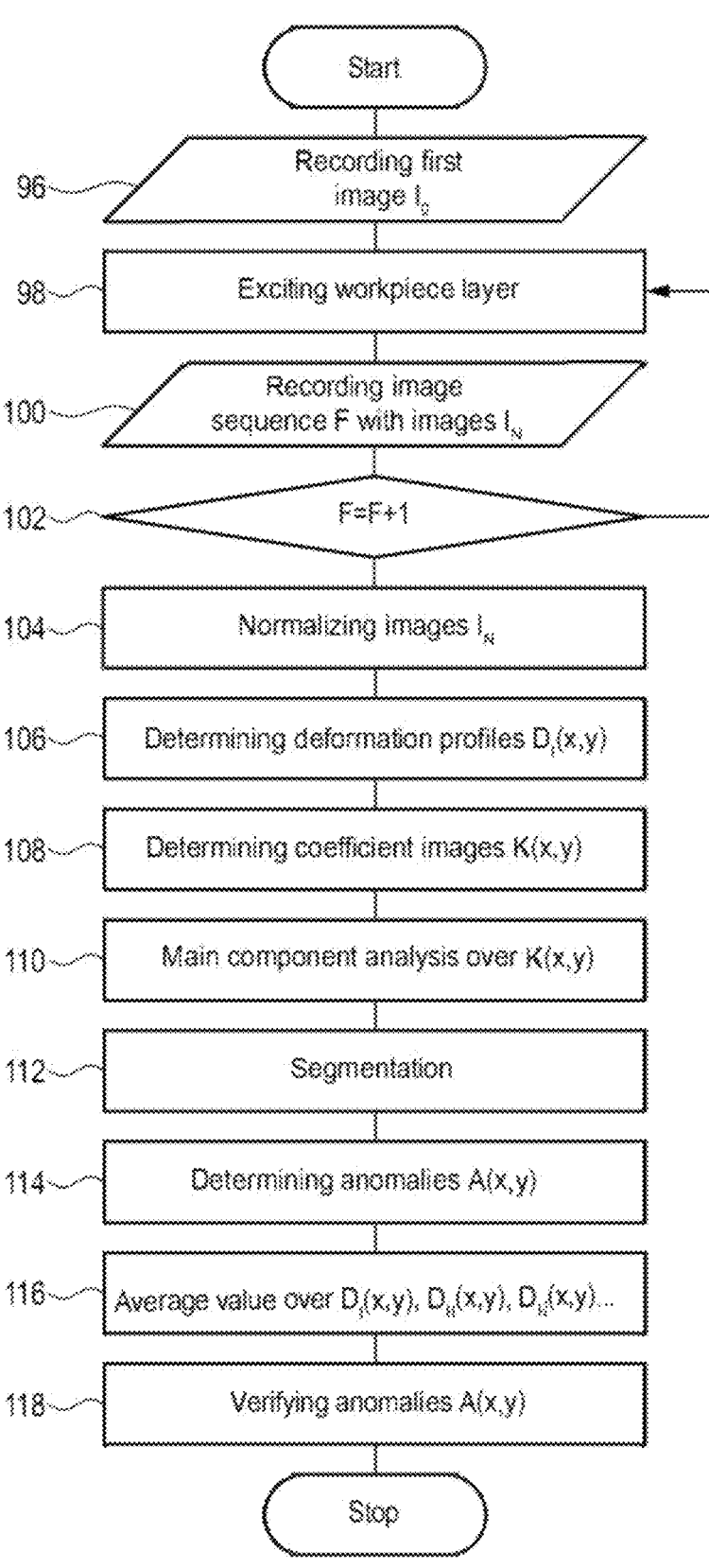
FIG. 6 is a flowchart to explain the inspection of a topmost workpiece layer in an example embodiment.

FIG. 6 shows an example embodiment for the inspection of the workpiece layer 20 according to step 90 from FIG. 4. In step 96, a first image $I_0$ of the topmost workpiece layer 20 is recorded before thermal excitation takes place in step 98. According to step 100, upon switching off (cf. FIG. 2) and/or at the start of the thermal excitation (cf. FIG. 4), an image sequence F with a plurality of temporally successive (staggered) images $I_N$ is recorded. According to step 102, a decision is made as to whether a further image sequence F+1 should be recorded, wherein the thermal excitation then preferably takes place in step 98 with a different intensity, a different duration, and/or a different excitation location and/or excitation pattern.

It is possible to take advantage of the fact that the characteristic transient features scale differently with the introduced heating energy, depending on whether they are caused by an anomaly-related heat build-up or by surface roughness. When comparing the coefficient images described below for different heating settings, the respective change or scaling behavior provides an additional distinguishing feature between a pure surface effect and an anomaly signature.

According to the optional step 104, the images $I_N$ of all the image sequences F are advantageously normalized. For example, the image content of the first image $I_0$ can be subtracted from each picture $I_N$ of the image sequence F to eliminate image background not caused by the thermal excitation. To correct for vibrations, in particular if there is little surrounding material or at edges, a zero-order or higher-order Legendre fit (or other polynomial fit) subtraction can advantageously be applied to each image of the image stack. In addition, a Legendre fit subtraction (or other polynomials) can be advantageously used to compensate for the effect of a spatially varying heating profile and/or to increase anomaly contrast. Furthermore, local frequency filters or Legendre fit subtractions can advantageously contribute to better distinguishing defects, since defects display a different deformation behavior than their surrounding area. The effects of a spatially slowly varying heating profile can therefore be distinguished from the local influences of the defects themselves.

According to step 106, a plurality of individual deformation profiles $D_I$ (x,y) are then determined for a plurality of pixels of the image sequences. According to step 108, coefficient images K(x,y) are determined using the individual deformation profiles $D_I$(x,y). In one variant, the slope during the thermal excitation, the overshoot maximum height and/or its instant of time and/or the fall-off deformation and/or any turning points in the deformation profiles can be determined pixel by pixel as coefficients. In another variant, the respective temporal change in the deformation profile can be determined pixel by pixel in linear or logarithmic form by a polynomial or by a rational function with several degrees of freedom, advantageously with 6 degrees of freedom. The coefficients of the polynomial or of the rational function then form the coefficients of the coefficient images K(x,y).

The entire information of the temporal profile with the abovementioned effects is then compressed in a few coefficient images K(x,y), which is advantageous with regard to storage requirements and data transmission. Using principal component analysis according to step 110, these coefficient images can be converted into a smaller number of more compressed PCA coefficient images. Cluster algorithms for segmentation purposes according to step 112 are advantageously applied here to this compressed form. In combination with a threshold value decision, an anomaly probability can then be determined in the respectively segmented image regions according to step 114. In order to obtain information about the depth of the anomaly, too, the instant of time when a defect signature first occurs, i.e., the "onset time," or the instant of time of the maximum overshoot can be determined. Both signatures provide information about the relative depths of anomalies. For example, a relatively early overshoot maximum in a period of up to 10 ms after switching off the thermal excitation indicates an anomaly, while an overshoot maximum 20 ms after switching off the thermal excitation or even later indicates that the deformation profile was recorded at the periphery of a workpiece layer.

Another (optional) method for distinguishing between the effects of surface roughness and the effects induced by anomalies below the surface is the combining calculation of a plurality of measurement signals recorded at the same location but in successive layers, according to step 116. The respective layer surfaces of different layers vary and are often uncorrelated, whereas the anomalies below the surface persist and decrease only in terms of signal strength due to the increasing depth. If a weighted average is formed from N successive layer measurements at the same position, the surface signal is reduced by a factor of $\sim(1/\sqrt{N})$ compared with the anomaly proportion.

According to step 118, additional information from other measurement methods can optionally be used to further increase the accuracy and reliability, in particular to improve the detection of anomalies and the separation of anomalies and surface effects and/or to increase the speed of the measurement method by preselecting regions (ROIs) and/or to better determine the spatial location (especially depth) and/or to classify it in terms of size and/or shape. In particular, further data from other measurement methods can be included in the analysis. These other measurement methods for a multimodal analysis that measure locally or cover the entire surface include measurement of the topography and determination of surface defects using the illumination modules 50*a*, 50*b* and a method as described in US 2020/158499 A1, measurement of spatially resolved vibration distribution (vibrometry), determination of surface gradients and surface shape/topography by means of shearography, measurement of structure-borne sound (e.g., pulse-echo method with ultrasonic transducers and/or contactlessly with EMATs) on the base plate of the workpiece to be built up in layers, in particular for defect classification, measurement of properties of the temporary melt pool, e.g., average temperature radiation from the melt pool using a pyrometer or spatially resolved imaging of the melt pool by means of a camera in the VIS or IR spectrum, white light interferometry (WLI) to determine statistic sizes of the surface (e.g. roughness, power spectral density (PSD)), measurement methods to determine the temperature dependence of material constants (e.g., heat capacity, thermal expansion, thermal conduction, elastic moduli) in the process-relevant range (room temperature to melting temperature).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method for additively manufacturing a workpiece, comprising:

obtaining a dataset that defines the workpiece in a plurality of workpiece layers arranged one on top of the other;

producing the plurality of workpiece layers arranged one on top of the other using a layer forming tool which is controlled in dependence on the dataset, wherein the plurality of workpiece layers form a layer stack which, at a defined instant of time, has a respective topmost workpiece layer and a number of respective workpiece layers underneath;

thermally exciting the layer stack at the defined instant of time;

recording a sequence of images of the respective topmost workpiece layer; and inspecting the layer stack using the sequence of images in order to obtain an inspection result that is representative of the workpiece, wherein an individual temporal deformation profile of the respective topmost workpiece layer is determined in response to the thermal excitation using the sequence of images, wherein the individual temporal deformation profile has a plurality of characteristic features including an individual deformation increase, an individual deformation maximum, and an individual deformation decrease, and wherein the inspection result is determined by evaluating at least one of the characteristic features from the plurality of characteristic features.

2. The method of claim 1 wherein the inspection result is determined by evaluating at least two of the characteristic features from the plurality of characteristic features.

3. The method of claim 1 wherein the at least one of the characteristic features includes the individual deformation maximum.

4. The method of claim 1 wherein determining the inspection result comprises determining at least one of a slope of the individual temporal deformation profile or an instant of time when the individual deformation maximum occurs.

5. The method of claim 1 wherein determining the inspection result comprises determining a turning point in the individual temporal deformation profile.

6. The method of claim 1 wherein:

each image from the sequence of images has a plurality of image segments, a respective individual temporal deformation profile is determined for each image segment from the plurality of image segments in response to the thermal excitation, and the inspection result is determined based on the respective individual temporal deformation profiles.

7. The method of claim 1 wherein:

the thermal excitation of the layer stack includes a thermal excitation of the topmost workpiece layer in a first layer region which is locally delimited, the sequence of images show the first layer region and a further layer region of the topmost workpiece layer, and the first layer region and the further layer region are disjoint.

8. The method of claim 1 wherein:

the sequence of images include at least one first image of the topmost workpiece layer which was recorded before the thermal excitation, and the inspection result is determined using the at least one first image and further images recorded after the thermal excitation.

9. The method of claim 1 wherein the sequence of images are normalized using at least one reference image before the individual temporal deformation profile is determined.

10. The method of claim 1 wherein the sequence of images are recorded with a frame rate of $\geq 1$ kHz.

11. The method of claim 1 wherein the inspection result is determined based on the sequence of images using a principal component analysis.

12. The method of claim 1 wherein:

the layer stack is repeatedly thermally excited, at least one excitation parameter is varied between repeated excitations, and the inspection result is determined based on the repeated excitations.

13. The method of claim 12 wherein the at least one excitation parameter is an excitation intensity or an excitation duration.

14. The method of claim 1 wherein:

the thermally exciting, recording a sequence of images, and inspecting the layer stack using the sequence of images are repeated for a plurality of respective topmost workpiece layers, and the method further comprises determining a plurality of inspection results based on the plurality of respective topmost workpiece layers.

15. The method of claim 14 wherein a weighted average is formed from the plurality of inspection results in order to detect an undesired anomaly in the layer stack.

16. The method of claim 1 wherein the individual temporal deformation profile is determined using a measurement method including at least one of: speckle interferometry, digital holography, shearography, laser Doppler vibrometry, Fabry-Perot interferometry, Sagnac interferometry, or interferometry with nonlinear optics.

17. The method of claim 1 wherein the inspection result is additionally determined using at least one of a thermal transient profile, ultrasonic excitation, a simulated deformation profile, a melt pool characterization, or angle-selective illumination of the topmost workpiece layer.

18. An apparatus for additively manufacturing a workpiece, the apparatus comprising:

a memory configured to store a dataset that defines the workpiece in a plurality of workpiece layers arranged one on top of the other;

a manufacturing platform;

a layer forming tool;

a heating tool;

a camera directed at the manufacturing platform; and an evaluation and control unit configured to:

produce a plurality of workpiece layers arranged one on top of the other on the manufacturing platform using the layer forming tool and the dataset, the plurality of workpiece layers forming a layer stack which, at a defined instant of time, has a topmost workpiece layer and a number of workpiece layers underneath, thermally excite the layer stack at the defined instant of time using the heating tool, record a sequence of images of the topmost workpiece layer using the camera, determine an individual temporal deformation profile of the topmost workpiece layer in response to the thermal excitation using the sequence of images, and inspect the layer stack using the individual temporal deformation profile, wherein the individual temporal deformation profile has a plurality of characteristic features including an individual deformation increase, an individual deformation maximum, and an individual deformation decrease, and wherein the evaluation and control unit determines an inspection result using at least one of the characteristic features from the plurality of characteristic features.

* * * * *